(12) United States Patent
Barth et al.

(10) Patent No.: US 11,836,433 B2
(45) Date of Patent: Dec. 5, 2023

(54) MEMORY INSTANCE RECONFIGURATION USING SUPER LEAF CELLS

(71) Applicant: Synopsys, Inc., Mountain View, CA (US)

(72) Inventors: John Edward Barth, Williston, VT (US); Jeffrey C. Herbert, Naples, FL (US); Matthew Christopher Lanahan, Fairfield, VT (US)

(73) Assignee: Synopsys, Inc., Sunnyvale, CA (US)

( * ) Notice: Subject to any disclaimer, the term of this patent is extended or adjusted under 35 U.S.C. 154(b) by 71 days.

(21) Appl. No.: 17/592,404

(22) Filed: Feb. 3, 2022

(65) Prior Publication Data

US 2023/0244844 A1 Aug. 3, 2023

(51) Int. Cl.
*G06F 30/39* (2020.01)
*G06F 30/3312* (2020.01)
*G06F 30/3315* (2020.01)

(52) U.S. Cl.
CPC .......... *G06F 30/39* (2020.01); *G06F 30/3312* (2020.01); *G06F 30/3315* (2020.01)

(58) Field of Classification Search
USPC ........................................................ 716/122
See application file for complete search history.

(56) References Cited

U.S. PATENT DOCUMENTS

| | | |
|---|---|---|
| 2003/0115035 A1 | 6/2003 | Kulshreshtha et al. |
| 2015/0234950 A1* | 8/2015 | Iyer ........................... G11C 8/16 716/104 |

OTHER PUBLICATIONS

International Search Report and Written Opinion, Application No. PCT/US2023/010828, dated May 15, 2023.
Kulshreshtha P et al., "Transistor-level Timing Analysis Using Embedded Simulation", Proceedings of the IEEE/ACM International Conference on Computer Aided Design, Nov. 5, 2000 pp. 344-348.
Yang L et al., "Frosty: A Program for Fast Extraction of High-Level Structural Representation From Circuit Description for Industrial CMOS Circuits", Integration the VLSI Journal, vol. 39, No. 4, Jul. 1, 2006 pp. 311-339.

* cited by examiner

*Primary Examiner* — Bryce M Aisaka
(74) *Attorney, Agent, or Firm* — Patterson + Sheridan, LLP

(57) ABSTRACT

A system and method for characterizing a memory instance. Characterizing a memory instance includes obtaining a memory instance comprising a plurality of leaf cells. Each of the plurality of leaf cells comprises components. First channel connected components from the components within each of the plurality of leaf cells are determined, and a first super leaf cell is generated by combining a first two or more leaf cells of the plurality of leaf cells based on the first channel connected components. Further, an updated memory instance is generated based on the first super leaf cell, and a timing model is determined for the updated memory instance.

18 Claims, 11 Drawing Sheets

MEMORY INSTANCE RECONFIGURATION USING SUPER LEAF CELLS

TECHNICAL FIELD

The present disclosure relates to characterizing a memory instance, and, more specifically, to reconfiguring a memory instance and characterizing the reconfigured memory instance.

BACKGROUND

Memory compilers construct (or build) memory instances based on a corresponding design, and other associated collateral. A characterization system analyzes memory instances to generate data used to generate timing rules for the memory instances. For example, characterizing the memory instances includes generating timing rules for the memory instances. Timing rules are a description of the signal delays and connections within a memory instance. The timing rules are used to generate timing models for the memory instances. Typically, characterization systems perform a transient analysis or a static analysis on a memory instance to determine the corresponding timing rules. Transient analysis includes analyzing a memory instance at the transistor level and characterizing the complete memory instance in a single process. As the transient analysis is performed at the transistor level, the processing requirements and processing time used when performing transient analysis is based on the transistor count and the complexity of the model. Accordingly, as the number of transistors increases and/or the complexity of the model increases, the processing requirements and processing time also increase exponentially.

In a static analysis process, delays as a signal progresses through a memory instance are summed up. Static analysis characterizes all possible paths a signal may propagate along within a memory instance. Static timing is applied to the entire memory instance, summing up each of the delays to determine a timing model for the memory instance. However, the amount of processing time and processor resources to perform static analysis increases as the size of the memory instance increases, making the analysis time consuming and resource intensive. Further, in current implementations, the analysis is repeated for characterizing the memory instances.

SUMMARY

In one example, a method includes obtaining a memory instance comprising a plurality of leaf cells. Each of the plurality of leaf cells comprises components. The method further includes determining first channel connected components from the components within each of the plurality of leaf cells, and generating a first super leaf cell by combining a first two or more leaf cells of the plurality of leaf cells based on the first channel connected components. Further, the method includes generating an updated memory instance based on the first super leaf cell, and determining a timing model for the updated memory instance.

In one example, a system comprises a memory storing instructions, and a processor, coupled with the memory and configured to execute the instructions, the instructions when executed cause the processor to obtain a memory instance comprising a plurality of leaf cells. Each of the plurality of leaf cells comprises components. The processor is further caused to determine first channel connected components from the components within each of the plurality of leaf cells, and generate a first super leaf cell by combining a first two or more leaf cells of the plurality of leaf cells based on the first channel connected components. The processor is further caused to generate an updated memory instance based on the first super leaf cell, and determine a timing model for the updated memory instance.

In one example, a non-transitory computer readable medium comprises stored instructions, which when executed by a processor, cause the processor to determine first channel connected components and second channel connected components from components within a plurality of leaf cells of a memory instance, and generate a first super leaf cell by combining a first two or more of the plurality of leaf cells based on the first channel connected components. Further, the processor is caused to generate a second super leaf cell by combining a second two or more of the plurality of leaf cells based on the second channel connected components, and determine a first timing delay of the super leaf cell and a second timing delay of the second super leaf cell. The processor is further caused to generate an updated memory instance based on the first super leaf cell and the second super leaf cell, and determine characteristics for the updated memory instance based on the first timing delay and the second timing delay.

BRIEF DESCRIPTION OF THE DRAWINGS

The disclosure will be understood more fully from the detailed description given below and from the accompanying figures of embodiments of the disclosure. The figures are used to provide knowledge and understanding of embodiments of the disclosure and do not limit the scope of the disclosure to these specific embodiments. Furthermore, the figures are not necessarily drawn to scale.

DETAILED DESCRIPTION

Figure 1:
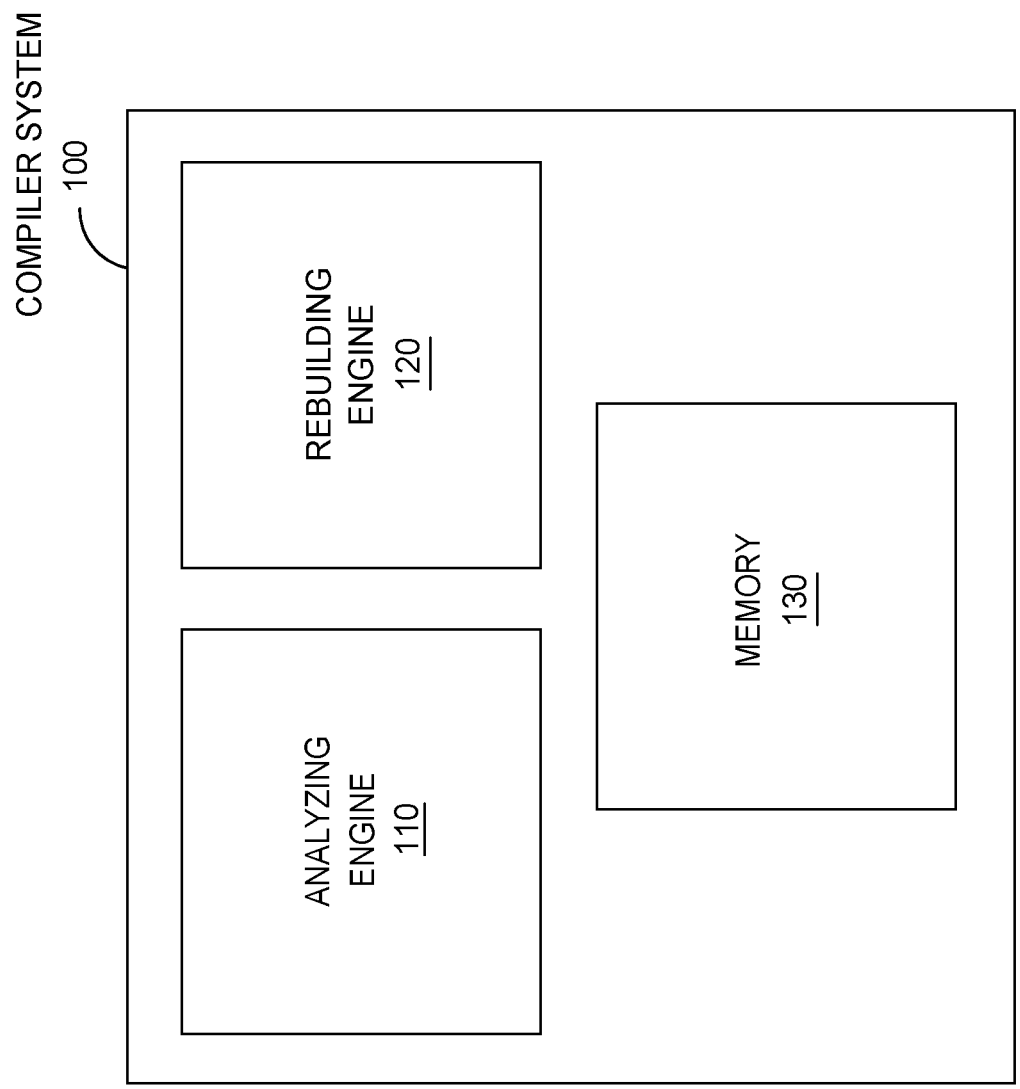
FIG. 1 illustrates a block diagram of a characterization system, according to one or more examples.

Aspects of the present disclosure relate to memory instance reconfiguration using super leaf cells. Memory compilers generate memory instances based on a memory design. A memory design may include multiple (e.g., hundreds or thousands) of memory instances. In one example, a memory design is a random access memory (RAM) device. In other examples, the memory designs may be other types of memory devices. In one or more examples, a memory compiler automatically generates a type of memory based on the corresponding design. During the memory generation process, a characterization system characterizes a memory instance to determine the corresponding timing rules and to generate a timing model. A timing rule is a description of the functionality of a memory instance. In one example, timing rules correspond to the signal delays within the memory instance. The signal delays are between pins of the memory. A signal delay may correspond to a signal being received at a first pin, e.g., pin a, within a memory instance and the delay of a corresponding signal output from a second pin, e.g., pin b, of the memory instance. Timing rules define the pins and the corresponding delays. The characteristics of the delay are based on the input parameters, e.g., slew rate of input signal and the load at the output pin, among others.

In one example, a characterization system performs transient analysis to characterize a memory instance. Transient analysis is applied at the transistor level of a memory instance to analyze the entire memory instance. Transient analysis includes applying one more signals and analyzing the delays within the memory instance as the signal or signals propagate through the transistors of the memory instance. The processor resources and processing time used to perform transient analysis corresponds to the number of transistors of the memory instance and the complexity of the memory instance. Accordingly, as the number of transistors of the memory instance and/or the complexity of the memory instance increase, the processor resources and/or the processing time increases exponentially.

In another example, a typical characterization system performs static analysis to characterize a memory instance. In performing static analysis, static timing is used to characterize a memory instance at the transistor level. Static analysis sums the delays of a signal as it progresses (e.g., propagates) through a memory. The delay is not necessarily based on a specific input, and, in some examples, the input may be vectorless. Static timing characterizes all possible paths that a signal may propagate within a memory instance. However, as with transient analysis, as the size and complexity of a memory instance increases, the processor resources and processing time that it takes to complete the static analysis process also increases.

In the following, a system and method for determining the characteristics of a memory instance using super leaf cells and hierarchy is described. Super leaf cells are formed from leaf cells of a memory instance. A leaf cells is the lowest block (e.g., cell) a memory compiler uses to build a memory instance. In one example, a leaf cell may be referred to as an atomic cell. A super leaf cell is a combination of at least a portion of one or more leaf cells. In one example, a super leaf cell contains a single whole leaf cell and no parts of any other leaf cells. In another example, a super leaf cell contains elements of at least two or more leaf cells. As will be described in greater detail in the following, the super leaf cell is generated based on the detection of channel connected components within the leaf cells of the memory instance. In one or more examples, the super leaf cells are characterized, and the characterization for each super leaf cell of the memory instance is combined to determine the characteristics (e.g., timing delays and timing model) for the entire memory instance.

The memory instance characterization method as described herein includes flattening the hierarchy of the leaf cells of a memory instance. Further, as will be described in more detail in the following, channel connected signals and channel connected components are identified and combined into super leaf cells to mitigate signal crossings between leaf cells in the memory instance. Further, a memory instance is reconfigured (e.g., rebuilt) based on the super leaf cells, and timing models are created from the reconfigured memory instances.

The characterization method described herein uses less processing resources and less processing time than typical characterization methods. Accordingly, memory instances may be characterized in less time using less processing resources. Hence, a characterization system using the characterization method described herein is able to generate an increased number of memory instances using less processing resources and processing time as compared to typical characterization methods which are performed on an entire memory device as described above. Further, the characterization method as described herein may be completed by processing devices having less processing resources, reducing the cost of completing the memory characterization process.

FIG. 1 illustrates a block diagram of a characterization system 100, according to one or more examples. The characterization system 100 includes an analyzing engine 110, a rebuilding engine 120, and a memory 130. The characterization system 100 may be a memory characterization system, or other compiler systems. The characterization system 100 characterizes memory instances of a memory device. In one example, the characterization system 100 is coupled (e.g., communicatively coupled) with a memory compiler system. The memory compiler system compiles memory instances of a memory device based on the characterization information determined by the characterization system 100. In one example, the characterization system 100 compiles a memory instance by placing leaf cells within the memory instance based on compiler rules and supplied parameters. The memory compiling process uses the information determined during the characterization process. The characterization process is used to determine a timing model for a memory instance. In one example, the characterization system 100 receives a memory design from the memory 130, characterizes the memory instance using hierarchy information, and rebuilds (e.g., reconfigures) the memory instance based on the characterization. In one example, rebuilding the memory instance includes reconfiguring the leaf cells (e.g., nets) of the memory instance to encapsulate channel connected signals within the memory instance. Encapsulating a channel connected signal includes generating a cell or group of cells that includes each channel connected component that receives the channel connected signal. For example, as is described in the following, a super leaf cell including multiple leaf cells is formed to encapsulate the channel connected signal such that the input pin and output pin associated with the channel connected signal is included within the super leaf cell. In one or more examples, the characterization system 100 characterizes the memory instances and a memory compiler system rebuilds the memory instances by reconfiguring the leaf cells (e.g., nets) of the memory instance to encapsulate channel connected signals within the memory instance based on the characterization information.

The channel connected signal may be an analog signal. An analog signal may have a voltage value that is neither a logic value of 1 nor a logic value of 0. In one example, the voltage value of the analog signal is not the turn on voltage or turn off voltage for the transistors of the corresponding memory instance. Further, the analog signal does not have a voltage transition of a full voltage swing for the corresponding transistors of the memory instance.

The channel connected signals may cross between cells of a memory instance. Accordingly, analysis methods, such as static analysis methods, are not able to characterize the channel connected signals. As will be described in greater detail in the following, the characterization system 100 identifies the channel connected signals within a memory instance, traces the channel connected signal or signals to determine a corresponding propagation path or paths. Components within the memory instance along the propagation path or paths are identified. In one example, the components within the memory instance that receive a channel connected signal are grouped such that the channel connected signals and corresponding components may be characterized. In one example, the hierarchy of the memory instance is reconfigured to encapsulate the analog signals within super leaf cells.

Figure 12:
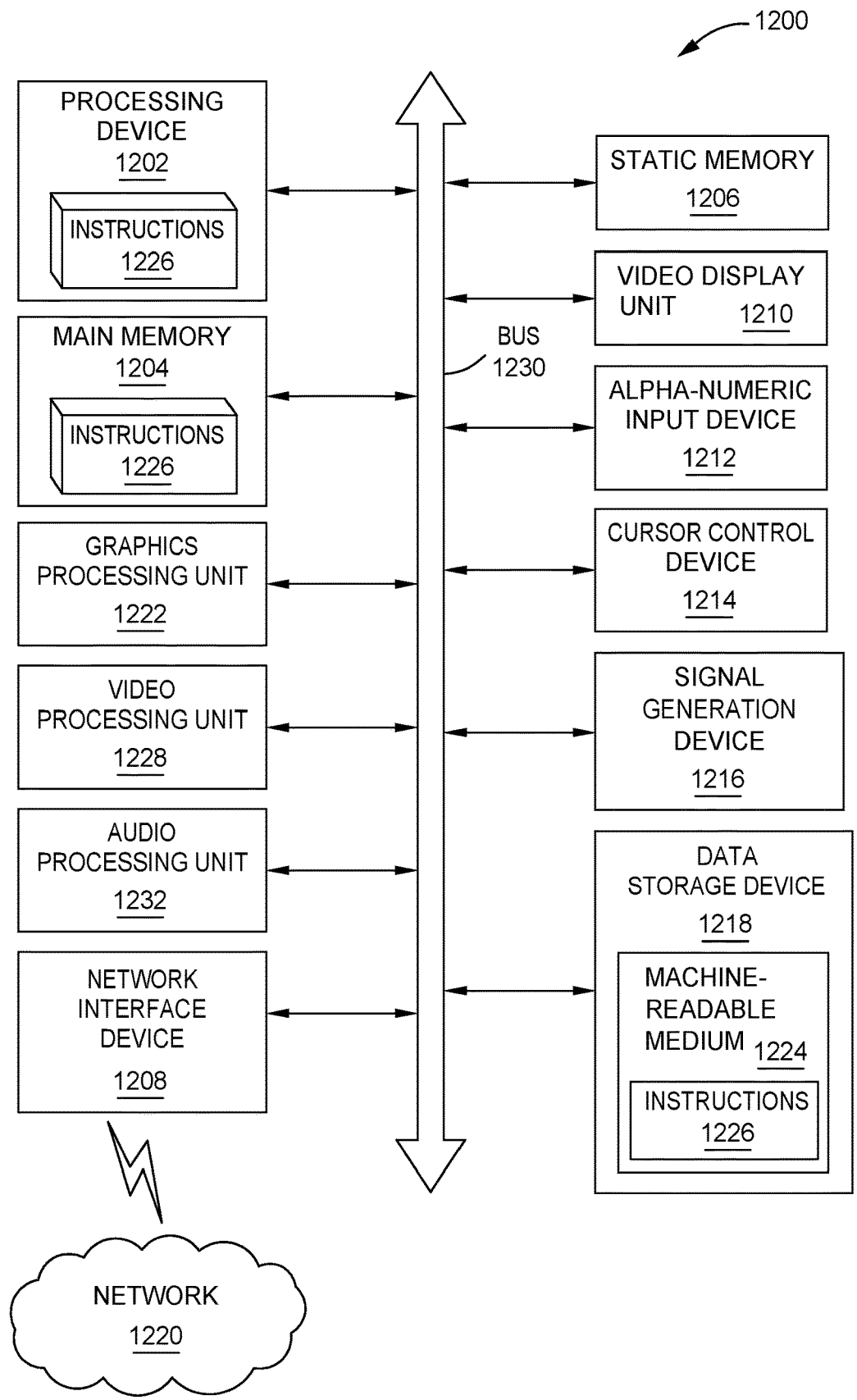
FIG. 12 depicts a diagram of an example computer system in which embodiments of the present disclosure may operate.

The characterization system 100 includes one or more processors (e.g., the processing device 1202 of FIG. 12) that execute instructions (e.g., the instructions 1226 of FIG. 12) stored in a memory (e.g., the memory 130, the main memory 1204 and/or the machine-readable medium 1224 of FIG. 12) to characterize a memory instance using hierarchy and to rebuild the memory instance based on the characterization.

The analyzing engine 110 includes one or more processors (e.g., the processing device 1202 of FIG. 12) that execute instructions (e.g., the instructions 1226 of FIG. 12) stored in a memory (e.g., the memory 130, the main memory 1204 and/or the machine-readable medium 1224 of FIG. 12). The analyzing engine 110 obtains circuit design from the memory 130. The analyzing engine 110 receives the memory design from memory 130 and determines elements that are along a propagation path of an analog signal, and determines super leaf cells based from the determined elements. The analyzing engine 110 determines the super leaf cells to encapsulate the channel connected signals and mitigate channel connected signal crossings within a memory instance. The analyzing engine 110 stores the super leaf cells within the memory 130. In one example, the analyzing engine 110 updates or generates a library based on super leaf cells.

The analyzing engine 110 further determines a timing model for the super leaf cells. For example, the analyzing engine 110 determines a timing delay for each super leaf cell. The timing delay for each super leaf cell is determined independently from each other. The timing delays are summed (e.g., added or combined in some other way) to determine a timing model for the entire memory instance. In one example, the analyzing engine 110 performs a static timing processing on the super leaf cells at the transistor levels. In other examples, the analyzing engine 110 performs other timing procedures on the super leaf cells to determine a timing model. The analyzing engine 110 stores the timing delays for each super leaf cell and/or the timing model for a memory instance are stored within the memory 130.

The rebuilding engine 120 includes one or more processors (e.g., the processing device 1202 of FIG. 12) that execute instructions (e.g., the instructions 1226 of FIG. 12) stored in a memory (e.g., the memory 130, the main memory 1204 and/or the machine-readable medium 1224 of FIG. 12). The rebuilding engine 120 obtains the super leaf cells, the timing delay information, and/or the timing model of a memory instance from the memory 130. The rebuilding engine 120 rebuilds the memory instance based on the super leaf cells, the timing delay information, and/or the timing model. In one or more examples, the rebuilding engine 120 assembles the super leaf cells in a high level compiled netlist (e.g., Verilog or another hardware description language (HDL)). The rebuilding engine 120 assembles the super leaf cells to generate an updated (e.g., rebuilt) electrically equivalent memory. In one example, the rebuilding engine 120 and/or one or more processes performed by the rebuilding engine 120 are part of and/or performed by a memory compiler system instead of the characterization system 100.

In one or more examples, the rebuilding engine 120 determines if the reconfigured (e.g., rebuilt) memory instance has the same functionality as the original (pre-built) memory instance. In one example, the reconfigured memory instance is logically compared to the original memory instance to determine if the reconfigured memory instance has the same functionality as the original memory instance. The reconfigured memory instance is saved to the memory 130.

Figure 2:
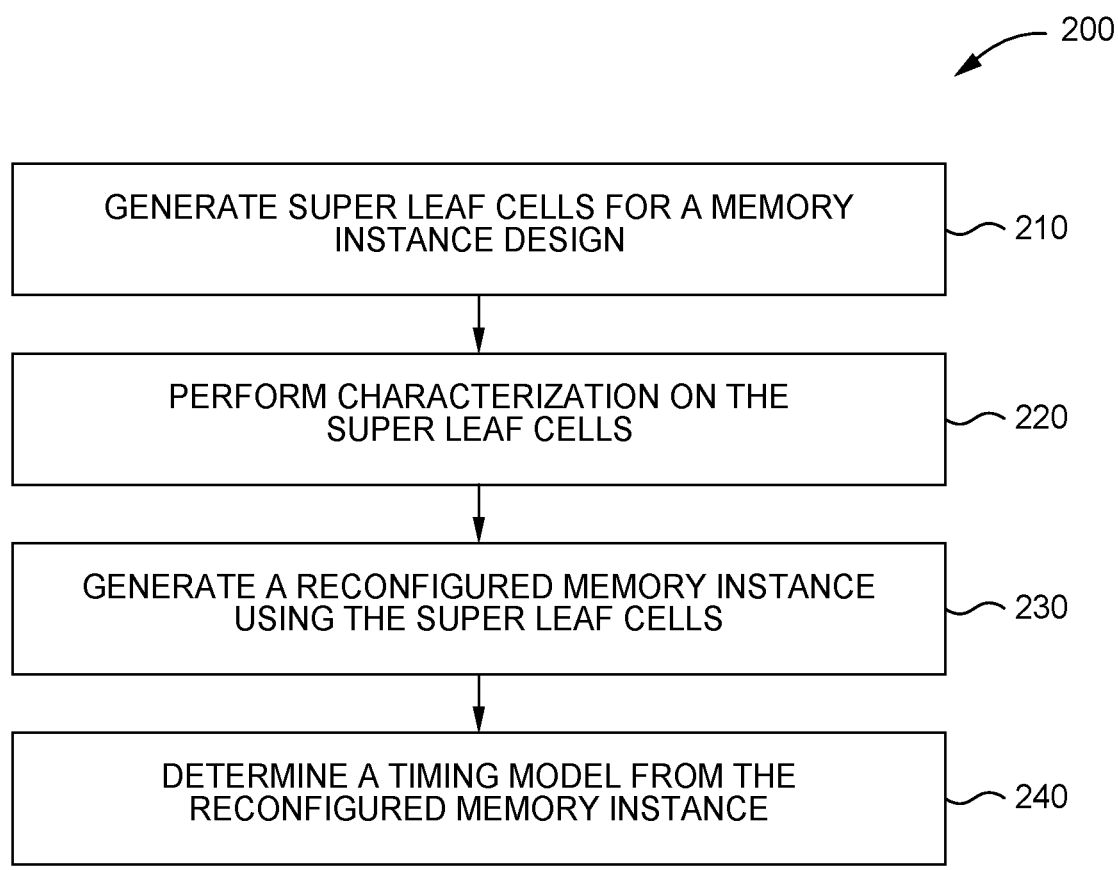
FIG. 2 illustrates a flowchart of a method for generating a reconfigured memory instance, according to one or more examples.

FIG. 2 illustrates a flowchart of a method 200 for determining a reconfigured memory instance and associated timing model, according to one or more examples. The method 200 is performed by the characterization system 100. For example, one or more processors (e.g., the processing device 1202 or FIG. 12) of the characterization system 100 execute instructions (e.g., the instructions 1226 of FIG. 12) stored in a memory (e.g., the memory 130 or the main memory 1204 and/or the computer readable medium 1224 of FIG. 12) to perform the method 200. In one example, the method 200 is performed as part of design planning 1122 of FIG. 11, and/or physical implementation 1124 of FIG. 11.

Figure 3:
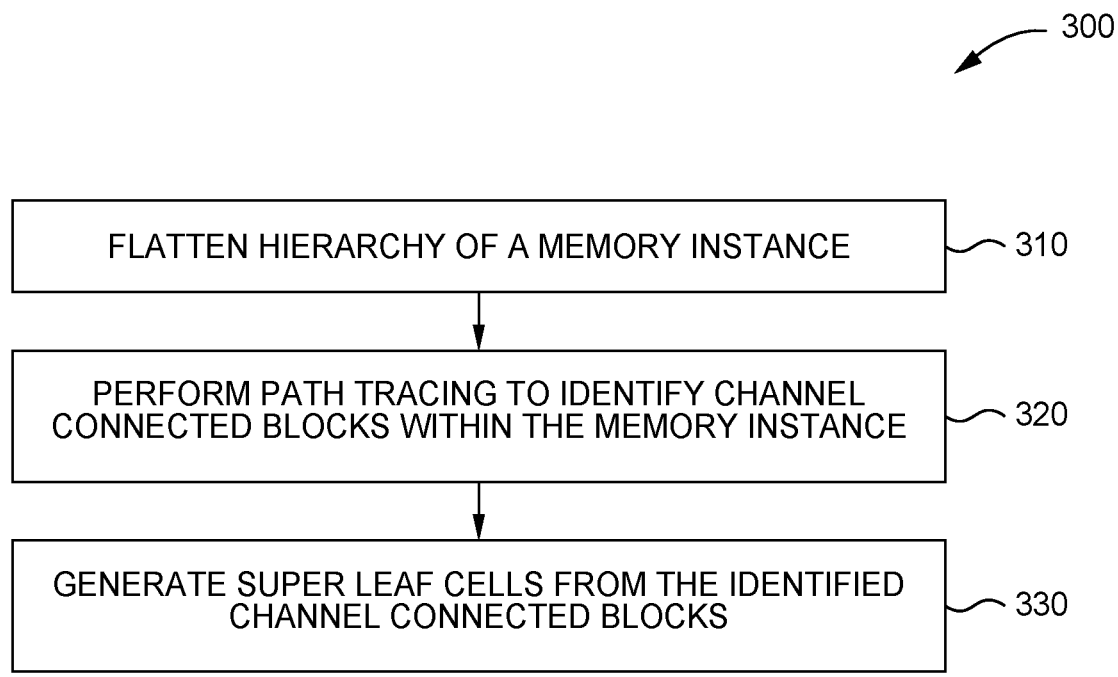
FIG. 3 illustrates a flowchart of a method for generating super leaf cells, according to one or more examples.

At 210 of the method 200, super leaf cells are generated for a memory instance. The analysis engine 110 generates the super leaf cells for the memory instance. FIG. 3 illustrates a flowchart of a method 300 for generating super leaf cells, according to one or more examples. The method 300 is performed by one or more processors (e.g., the processing device 1202 of FIG. 12) that execute instructions (e.g., the instructions 1226 of FIG. 12) stored in a memory (e.g., the memory 130, the main memory 1204 and/or the machine-readable medium 1224 of FIG. 12).

Figure 5:
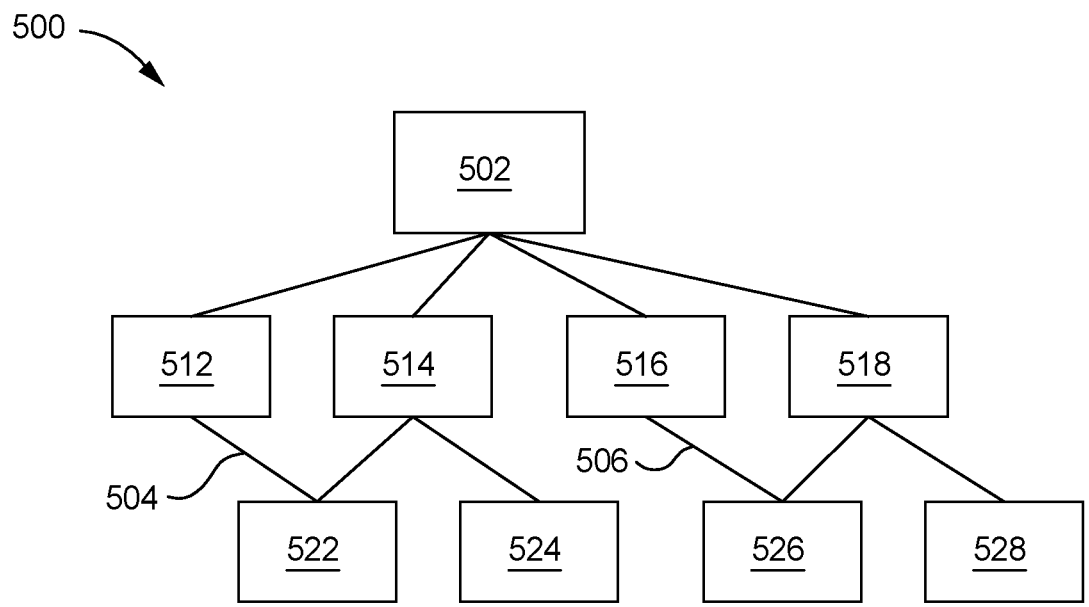
FIG. 5 illustrates hierarchy of a memory instance, according to one or more examples.

At 310 of the method 300, hierarchy of a memory instance is flattened. For example, the analysis engine 110 flattens the hierarchy of a memory instance. FIG. 5 illustrates cells of a hierarchy 500 of a netlist of a memory instance. The leaf cell 502 is the top cell at top level (e.g., first level) of the hierarchy 500 of the memory instance. The leaf cells 512, 514, 516, and 518 are connected to the leaf cell 502. The leaf cells 512, 514, 516, and 518 are at a level (e.g., a second level) of the hierarchy that is beneath (or lower) than the level associated with the leaf cell 502 (e.g., the first or top level). The leaf cells 512, 514, 516, and 518 may be the same type of cells or different types of leaf cells. In one or more examples, the leaf cells 512 and 514 are a first type and the leaf cells 514 and 518 are a second type. In other examples, other combinations of leaf cell types may be used.

The leaf cells 522, 524, 526, and 528 are at a level (e.g., third level) of the hierarchy that is beneath (or lower) than the level associated with the leaf cells 512, 514, 516, and 518. The leaf cells 522, 524, 526, and 528 are types of cells that are different from that the types of the leaf cells 512, 514, 516, and 518. In one example, each of the leaf cells 522, 524, 526, and 528 are the same type of leaf cells or different types of leaf cells. In other examples, the leaf cells 522 and 526 are a third type and the leaf cells 524 and 528 are a fourth type. In other examples, other combination of leaf cells may be used.

The leaf cells 522 and 524 are connected to the leaf cell 502 via the leaf cell 514. The leaf cells 526 and 528 are connected to the leaf cell 502 via the leaf cell 518. Further, the leaf cell 522 is connected to the leaf cell 512 via an analog signal 504 and the leaf cell 526 is connected to the leaf cell 516 via an analog signal 506.

An analog signal (e.g., the analog signals 504 and 506) may have a voltage value that is less than a full voltage swing for transistors. For example, an analog signal has a voltage value that is in between the turn on and/or turn off voltage for the transistors of the corresponding memory instance. In one example, the analog signals 504 and 506 have a voltage value is neither a logic value of 1 nor a logic value of 0.

During the characterization process to determining the timing model for a memory instance, analog signals that are channel connected signals may not be handled by typical characterization processes (e.g., static analysis). The analog signals 504 and 506 cross the boundary between two or more leaf cells (e.g., the boundary between the leaf cells 512 and 522, or the boundary between the leaf cells 516 and 526). The analog signals 504 and 506 are channel connected signals as the analog signals 504 and 506 cross the boundaries between leaf cells. Accordingly, by encapsulating the analog signals 504 and 506, a memory instance may be reconfigured such that the analog signal 504 and 506 may be characterized with static timing techniques.

Figure 6:
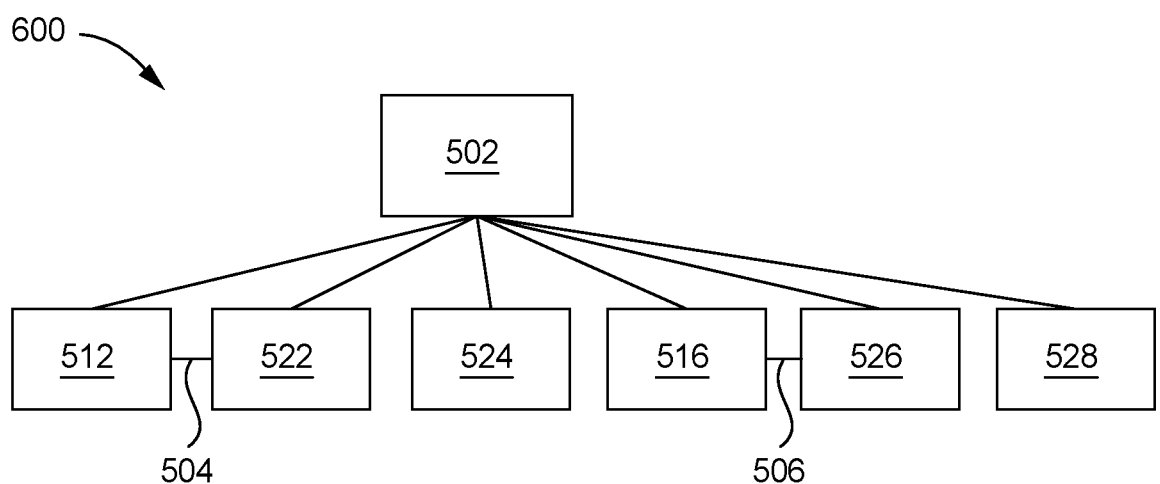
FIG. 6 illustrates hierarchy of a memory instance, according to one or more examples.

FIG. 6 illustrates a hierarchy 600 that has been flattened as compared to the hierarchy 500. In one example, flattening the hierarchy includes reducing the number of levels within a hierarchy. As compared to the hierarchy 500 of FIG. 5, the hierarchy 600 has a reduced number of levels. The hierarchy 600 has two levels of hierarchy as compared to the three levels of the hierarchy 500. Further, as compared to the hierarchy 500, in the hierarchy 600 the leaf cells 522, 524, 526, and 528 are connected directly to the leaf cell 502 without passing through another cell. To flatten the hierarchy, intermediate leaf cells, e.g., the leaf cells 514 and 518 are replaced with the leaf cells that are connected to them. For example, in FIG. 6, the leaf cells 514 and 518 are replaced with the leaf cells 522 and 524 and the leaf cells 526 and 528, respectively. Accordingly, the hierarchy 600 is flattened as compared to the hierarchy 500. Further, in FIG. 6, the analog signals 504 and 506 connect the leaf cells 512 and 522 and the leaf cells 516 and 526, respectively. The connection between the leaf cells 512 and 522 via the analog signal 504 and the connection between the leaf cells 516 and 526 via the analog signal 506 is maintained as the hierarchy is flattened.

At 320 of the method 300, path tracing is performed to identify channel connected blocks within the memory instance and channel connected signals. For example, the analysis engine 110 performs path tracing to identify channel connected blocks to identify channel connected signals that cross between cell boundaries. In one example, a channel connected signal is an analog signal. The analysis engine 110 performs path tracing by starting at an input node and tracing the propagation path for a signal until an output node is reached. In one example, path tracing is performed based on a node or input identified by a user or designer. The identified nodes may be stored in the memory 130. Each component that is part of the propagation path is determined to be a channel connected component. In one example, the components are transistors. In other examples, the components are circuit elements other than transistors.

Two or more transistors are considered to be channel connected when the two or more transistors have a common source or drain. For example, if there is a source or drain connection between two transistors, those transistors are considered to be channel connected components. An analog signal crosses a boundary between cells and is considered to be a channel connected signal when the path of an analog signal includes channel connected components.

Figure 7:
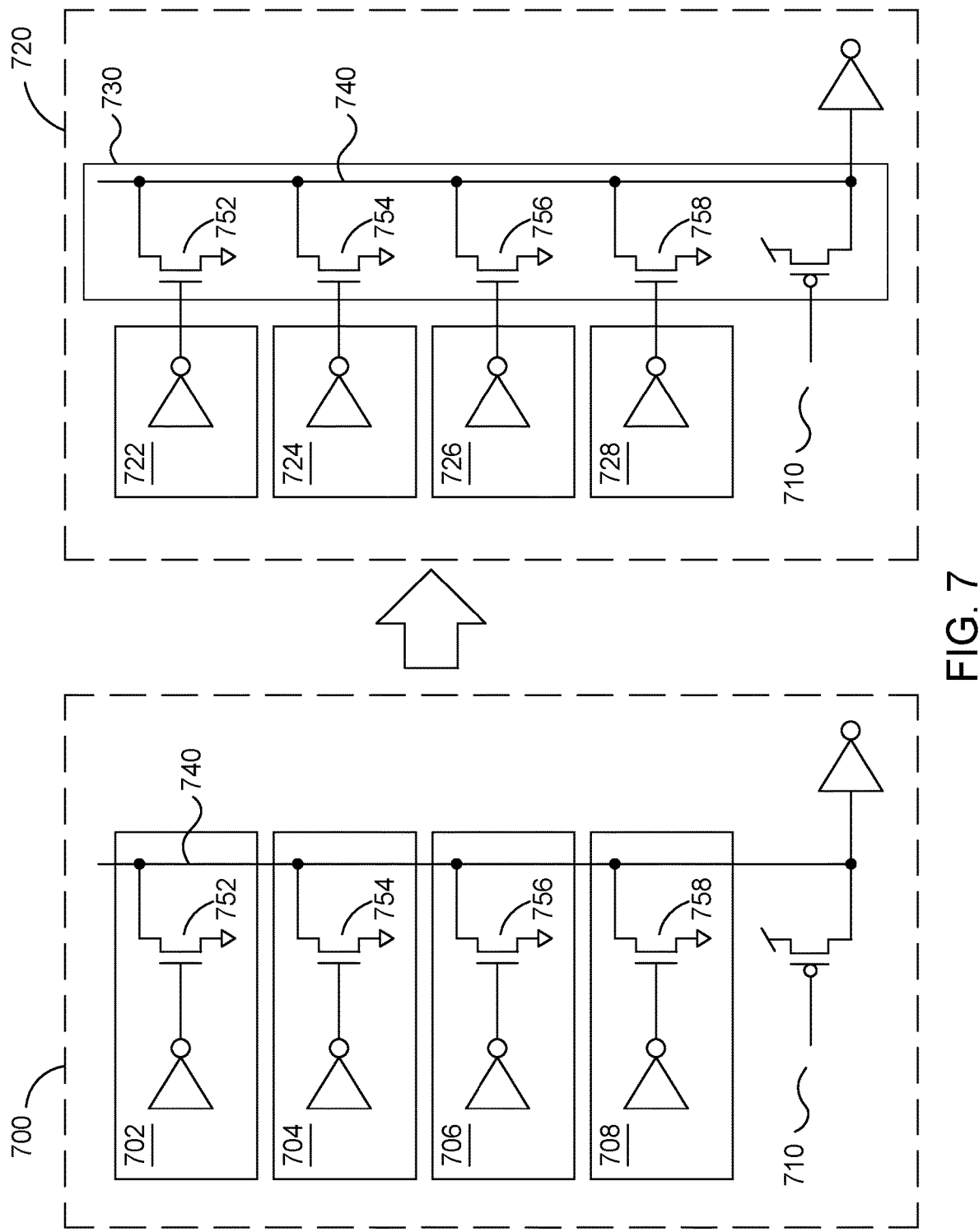
FIG. 7 illustrates an example memory instance and reconfigured memory instance, according to one or more examples.

FIG. 7 illustrates a memory instance before and after a channel connected signal and components have been identified and encapsulated. In the portion 700, the leaf cells 702, 704, 706, and 708, include transistors (components) 752, 754, 756, and 758, respectively, and are interconnected via the signal line 740. Further, the signal line 740 is connected to the transistor 710. The signal line 740 connects the sources, or drains, of the transistors 752, 754, 756, 758 and 710 to each other. Accordingly, the signal line 740 is determined to be channel connected and the signal along the signal line 740 is a channel connected signal. In one example, the signal line 740 communicates an analog signal.

At 330 of the FIG. 3, super leaf cells are generated from the identified channel connected blocks. The analysis engine 110 generates the super leaf cells from the identified channel connected blocks. In one example, channel connected blocks are combined to form a super leaf cell. With reference to FIG. 7, in the portion 720, the leaf cells 702, 704, 706, and 708 have been reconfigured into the leaf cells 722, 724, 726, 728, and 730. The leaf cell 730 includes the transistors 752, 754, 756, 758, and 710. Stated another way, the leaf cell 730 includes the channel connected components identified in the leaf cells 702, 704, 706 and 708. The leaf cell 730 is a super leaf cell, as the super leaf cell 730 includes portions of two or other leaf cells. The leaf cells 722, 724, 726, 728, and 730 are stored to the memory 130. While the super leaf cell 730 includes a portion of two or more leaf cells, in other examples, a super leaf cell additionally, or alternatively, includes an entirety of another leaf cell or cells.

Figure 8:
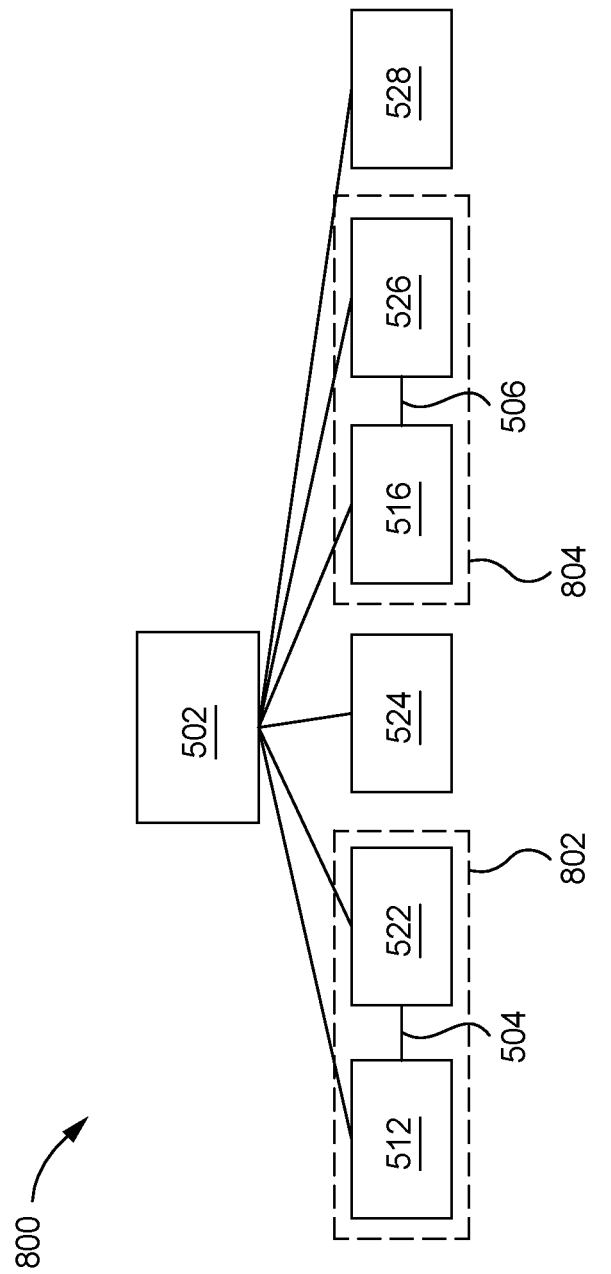
FIG. 8 illustrates hierarchy for a reconfigured memory instance, according to one or more examples.

FIG. 8 illustrates the hierarchy 800 where the leaf cells 512 and 522 and the leaf cells 516 and 526 have been combined into super leaf cells 802 and 804. As is noted above, the leaf cells 512 and 522 are connected via the analog signal 504 and the leaf cells 516 and 526 are connected via the analog signal 506. As the analog signals 504 and 506 connect the leaf cells 512 and 522 and the leaf cells 516 and 526, respectively, crossing the boundaries between the leaf cells, the analog signals 504 and 506 are determined to be channel connected signals. Accordingly, the components of the leaf cells 512 and 514 include channel connected components, and the leaf cells 516 and 526 include channel connected components. Generating the super leaf cells 802 and 804, encapsulates the analog signals 504 and 506 and corresponding components such that super leaf cells 802 and 804 may be characterized using a transistor level static analysis process or a transient analysis process, or another characterization process. In one or more examples, if the super leaf cells 802 and 804 are determined to be electrically and/or functionally equivalent, only one of the super leaf cells 802 and 804 is characterized. For example, the super leaf cell 802 is characterized and the super leaf cell 802 may replace the super leaf cell 804. Accordingly, the super leaf cell 804 does not need to be characterized, saving characterization time. The super leaf cells 802 and 804 may be determined to be electrically and/or functionally equivalent based on a comparison of the super leaf cells 802 and 804 to each other. In other examples, the super leaf cells 802 and 804 may be determined to be electrically and/or functionally equivalent based on a comparison of a netlist file including the super leaf cell 802 and a netlist file including the super leaf cell 804.

With further reference to the method 200 of the FIG. 2, at 220 of the method 200, the super leaf cells are characterized. Characterizing the super leaf cells includes performing a static analysis or a transient analysis (or other characterization processes) on the super leaf cells to determine the timing delays of the super leaf cells. In one example, the super leaf cells are characterized at the transistor level. The timing delays are stored within the memory 130.

Figure 9:
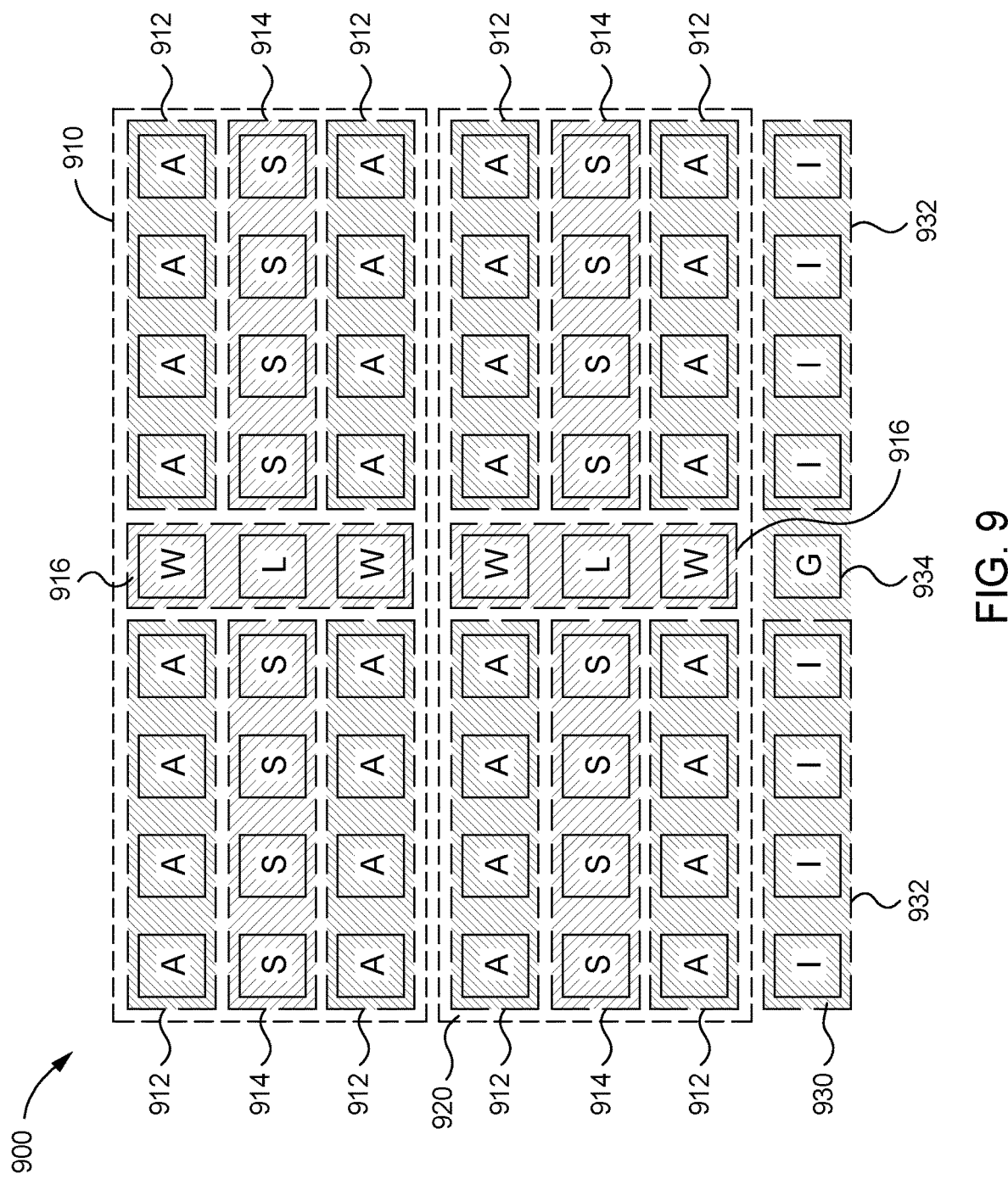
FIG. 9 illustrates an example memory instance, according to one or more examples.

At 230 of the method 200, a reconfigured memory instance is generated using the super leaf cells. The rebuilding engine 120 generates the reconfigured memory instance using the super leaf cells stored in the memory 130. For example, the leaf cells of a memory instance are reconfigured based on the super leaf cells stored in the memory 130. In one example, reconfiguring the leaf cells includes altering the layout of the leaf cells based on the super leaf cells. A memory instance includes a layout of leaf cells. The layout of the leaf cells may be based on the rules of a corresponding memory compiler and the memory design. FIG. 9 illustrates a memory instance 900 having a layout of the leaf cells A, S, W, L, I, and G. The A leaf cells are array cells, the S leaf cells are sensing amplifier cells, W leaf cells are wordline driver cells, L leaf cells are local control cells, I leaf cells are input/output cells, and G leaf cells are global control cells.

The memory instance 900 includes blocks 910, 920, and 930. The block 910 includes sub-blocks 912, 914, and 916. Each of the sub-blocks 912, 914, and 916 include leaf cells A, S, and W and L, respectively. The sub-blocks 912, 914, and 916 are generated such that memory instances including a similar cell structure may be more easily generated. For example, the block 920 has a similar sub-block structure as the block 910, accordingly, the sub-blocks 912, 914, and 916 are repeated between the blocks 910 and 920. Further, the block 930 includes sub-blocks 932 and sub-block 934. The block 930 includes two of the sub-blocks 932.

In one or more examples, an A leaf cell and an S leaf cell are channel connected. For example, an A cell of the sub-block 912 is channel connected to an S cell of the sub-block 914. Accordingly, as at least on pair of A and S blocks may be channel connected, the characterization process performed on the block 910 is completed at the leaf cell level. For example, each leaf cell of the memory instance 900 is characterized individually to determine a delay for the memory instance. Further, each time a memory instance is created, the characterization process is performed for each individual leaf cell. Accordingly, the characterization process is processing time and processor resource prohibitive.

However, by reconfiguring at least a portion of the leaf cells into super leaf cells that include channel connected components, each super leaf cells may be characterized as one unit. Further, by reusing super leaf cells between different memory instances, the timing delay information for the super leaf cells may be used for the different memory instances, without having to re-characterize the leaf cells for each memory instance. Accordingly, the amount of processing time and processing resources used to characterize a memory instance is reduced as compared to techniques that do not use super leaf cells.

Figure 10:
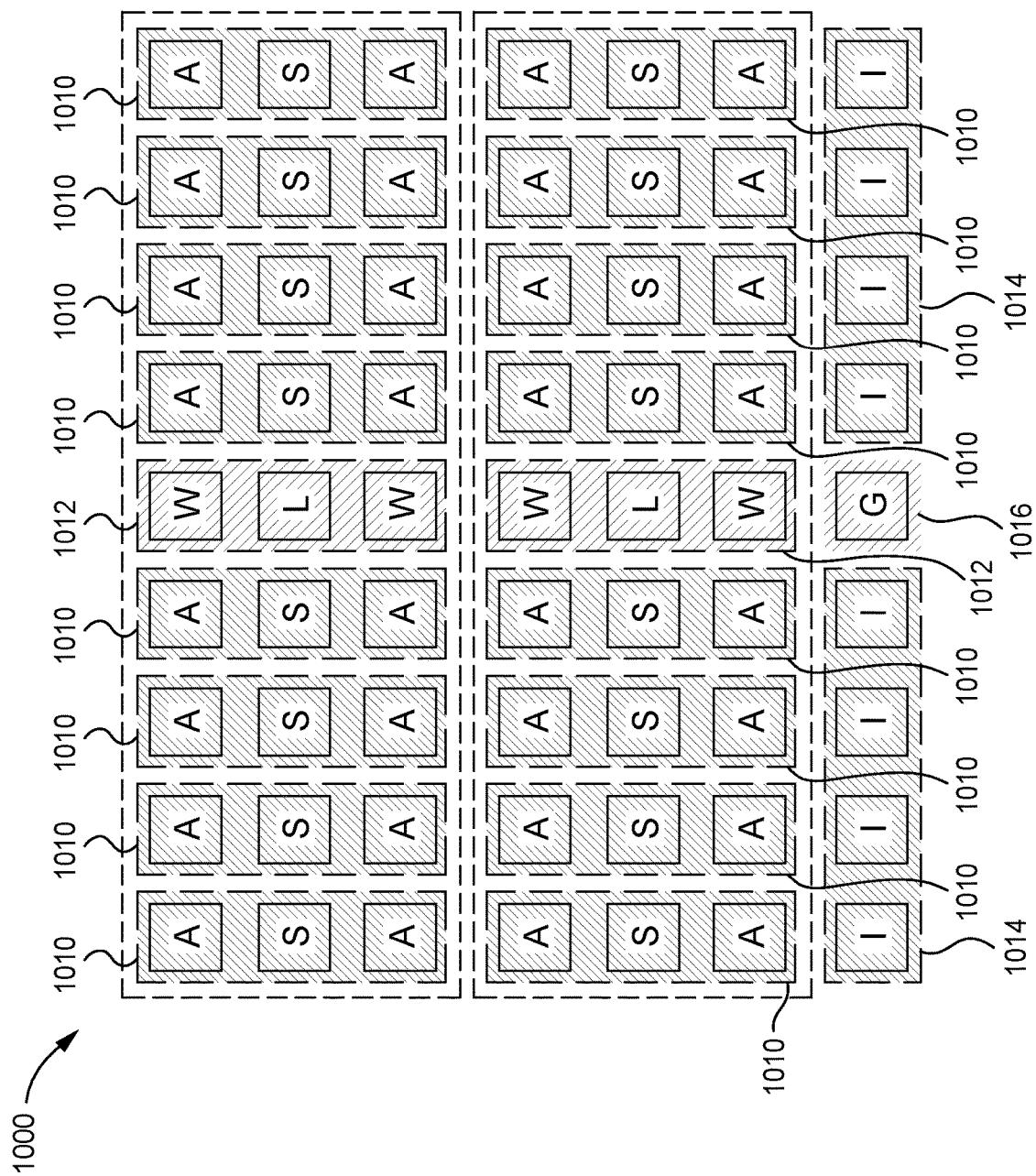
FIG. 10 illustrates a reconfigured memory instance, according to one or more examples.

FIG. 10 illustrates a memory instance 1000 that is reconfigured to include super leaf cells 1010 and 1012. As compared to the memory instance 900, leaf cells of the memory instance 1000 are reconfigured into the super leaf cells 1010 and 1012. The super leaf cells 1010 are formed from a vertical grouping of leaf cells while the sub-blocks 912 and 914 are formed from a horizontal grouping of leaf cells. In other examples, the super leaf cells 1010 and/or 1012 are formed by grouping the leaf cells along other directions. Further, the super leaf cells 1010 and/or 1012 are formed along a path of a channel connected signal. The super leaf cells 1010 and 1012 take into account any channel connected signals and components between the corresponding leaf cells. Accordingly, the super leaf cells 1010 and 1012 may be characterized to determine timing delays. The timing delays may be stored within the memory 130 and used to characterize the corresponding memory instance. Further, other memory instances may be generated using the super leaf cells. Accordingly, the characterization process of those memory instances includes summing the timing delays for each of the included super leaf cells instead of characterizing each leaf cell in the memory instance. Accordingly, the processing resources and time used to characterize the memory instance is reduced as compared to methods that include characterizing each leaf cell to determine a timing model.

The memory instance 1000 further includes sub-blocks 1014 and 1016. Either of the sub-blocks 1014 or 1016 may be super leaf cells. For example, the sub-block 1014 or 1016 includes channel connected components.

While the super leaf cells 1010 and 1012 are illustrated as including at least a portion of three leaf cells, in other examples, a super leaf cell may include more than or less than at least a portion of three leaf cells. Further, in one or more examples, at least one super leaf cell of a memory instance is larger (e.g., includes at least a portion of a greater number of leaf cells) than at least one other super leaf cell of the memory instance. In such an example, a memory instance may include two or more super leaf cells of different sizes.

In other examples, the configuration of the super leaf cells may differ from that illustrated in FIG. 10. For example, as is noted above, a super leaf cell may include leaf cells in directions that are oriented differently from that illustrated in FIG. 10. For example, a super leaf cell may include leaf cells in one or more directions. Further, a super leaf cell may include leaf cells in a horizontal direction, vertical direction, and/or other directions. In one example, a memory instance includes two or more super leaf cells having different configurations.

In one or more examples, the memory instance 1000 is updated, changing the super leaf cell 1010 and/or the super leaf cell 1012. The super leaf cell of the memory instance 1000 that is changed is re-characterized, while the super leaf cell of the memory instance 1000 that is not changed is not re-characterized. Accordingly, based on a change to the memory instance 1000, less than all of the memory instance 1000 may need to be re-characterized. As compared to examples where the super leaf cells are not used, the entirety of a memory instance is re-characterized based on the memory instance being changed. Accordingly, the processing resources and time to characterize the updated memory instance to determine an updated timing model is reduced as compared to typical characterization process that characterize each leaf cell of the updated memory instance.

Figure 4:
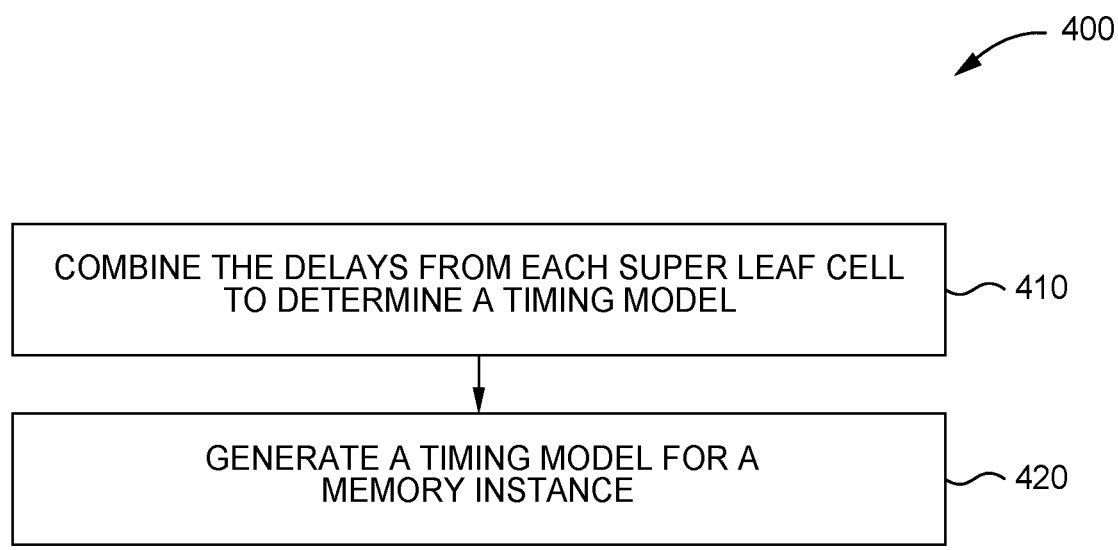
FIG. 4 illustrates a flowchart of a method for generating a timing model for a memory instance, according to one or more examples.

With further reference to FIG. 2, at 240 of the method 200, a timing model for the memory instance is determined. For example, the analysis engine 110 determines the timing model for the memory instance. The method 400 of FIG. 4 illustrates a method 400 for determining the timing model for the memory instance. As is described above with regard to 220 of the method 200, each super leaf cell is characterized. The analysis engine 110 performs a static or transient analysis (or another characterization process) to characterize the super leaf cells. The super leaf cells may be characterized before or after a memory instance is reconfigured with the super leaf cells. At 410 of the method 400, the delays from each super leaf cell are combined to determine the timing model for the memory instance. In one example, the delays from each of the super leaf cells of a memory instance are summed (e.g., added), or combined in some other way, to determine the timing model for the memory instance. For example, with reference to FIG. 10, the delays of each of the super leaf cells 1010, the super leaf cell 1012, the sub-blocks 1014, and the sub-block 1016 are summed (or combined in some other way) to determine the timing model for the memory instance 1000.

At 420 of the method 400, a timing model for the memory instance is generated. The timing model is generated by the analysis engine 110 based on the combined delays of the super leaf cells, and the characterization of any other blocks or leaf cells within the memory instance. For example, a memory instance may include leaf cells that are not included in any super leaf cells. Those leaf cells are characterized using a static analysis or transient analysis, or another characterization process, and the corresponding delays are combined with the delays of the super leaf cells to generate the timing model for the memory instance. The timing model for the memory instance is stored within the memory 130.

In one or more examples, a logical comparison between the reconfigured memory instance (e.g., the memory instance 1000) and the original (e.g., pre-reconfigured) memory instance is completed. The logical comparison may be completed after 230 of the method 200 and before 240 of the method 200. In such an example, if the reconfigured memory instance is not determined be a logical match with the original memory instance, 240 of the method 200 may not be performed. If the reconfigured memory instance is determined to be a logical match with the original memory instance, 240 of the method 200 is performed. The logical comparison between the reconfigured memory instance and the original memory instance is performed by the rebuilding engine 120.

Performing the logical comparison includes determining whether or not the reconfigured memory instance is functionally equivalent to the original memory instance. In one example, performing the logical comparison between the reconfigured memory instance and the original memory instance includes comparing the connectivity and functional operation of the reconfigured memory instance to the original memory instance.

Figure 11:
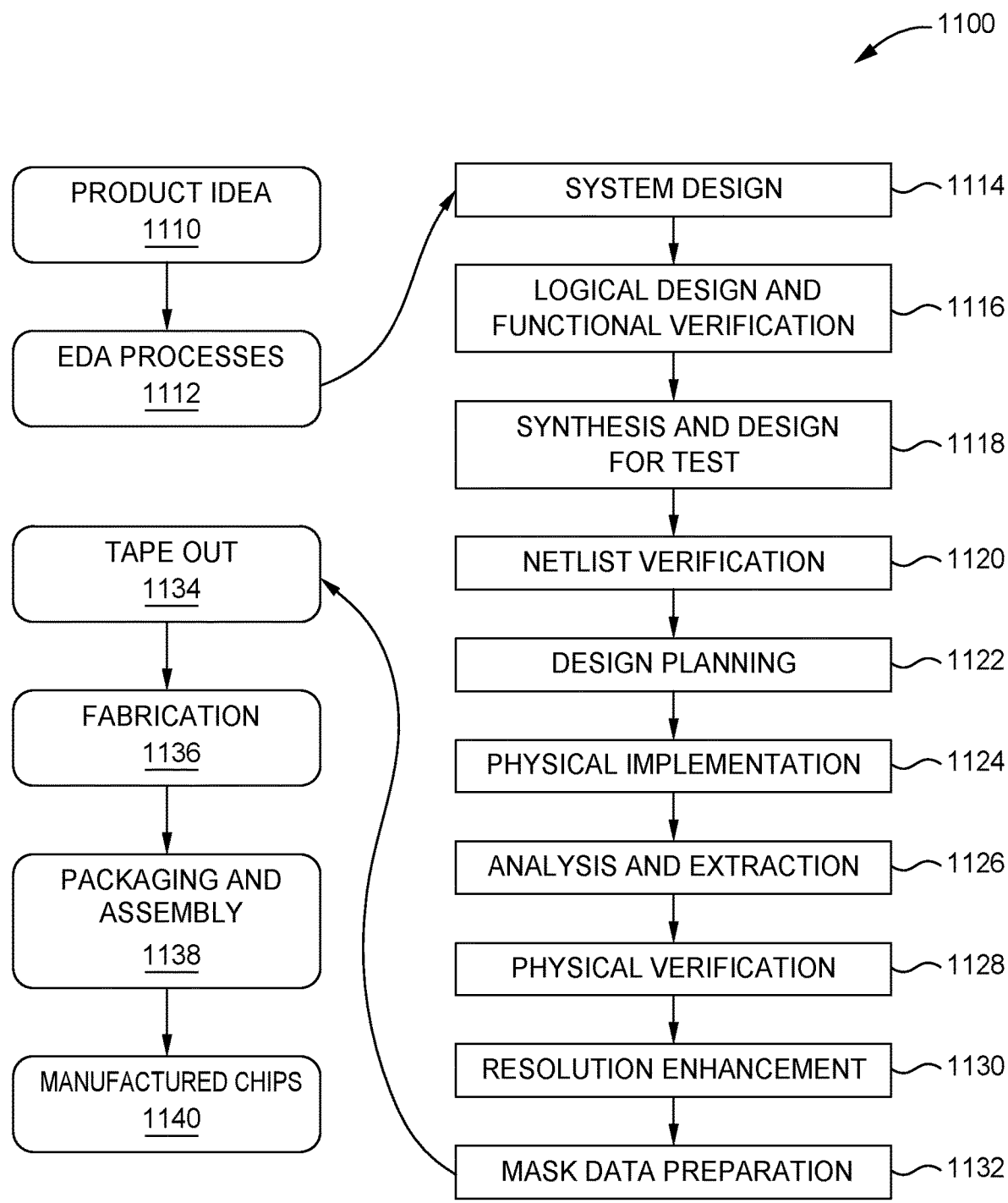
FIG. 11 depicts a flowchart of various processes used during the design and manufacture of an integrated circuit in accordance with some embodiments of the present disclosure.

FIG. 11 illustrates an example set of processes 1100 used during the design, verification, and fabrication of an article of manufacture such as an integrated circuit to transform and verify design data and instructions that represent the integrated circuit. Each of these processes can be structured and enabled as multiple modules or operations. The term 'EDA' signifies the term 'Electronic Design Automation.' These processes start with the creation of a product idea 1110 with information supplied by a designer, information which is transformed to create an article of manufacture that uses a set of EDA processes 1112. When the design is finalized, the design is taped-out 1134, which is when artwork (e.g., geometric patterns) for the integrated circuit is sent to a fabrication facility to manufacture the mask set, which is then used to manufacture the integrated circuit. After tape-out, a semiconductor die is fabricated 1136 and packaging and assembly processes 1138 are performed to produce the finished integrated circuit 1140.

Specifications for a circuit or electronic structure may range from low-level transistor material layouts to high-level description languages. A high-level of representation may be used to design circuits and systems, using a hardware description language ('HDL') such as VHDL, Verilog, SystemVerilog, SystemC, MyHDL or OpenVera. The HDL description can be transformed to a logic-level register transfer level ('RTL') description, a gate-level description, a layout-level description, or a mask-level description. Each lower representation level that is a more detailed description adds more useful detail into the design description, for example, more details for the modules that include the description. The lower levels of representation that are more detailed descriptions can be generated by a computer, derived from a design library, or created by another design automation process. An example of a specification language at a lower level of representation language for specifying more detailed descriptions is SPICE, which is used for detailed descriptions of circuits with many analog components. Descriptions at each level of representation are enabled for use by the corresponding tools of that layer (e.g., a formal verification tool). A design process may use a sequence depicted in FIG. 11. The processes described by be enabled by EDA products (or tools).

During system design 1114, functionality of an integrated circuit to be manufactured is specified. The design may be optimized for desired characteristics such as power consumption, performance, area (physical and/or lines of code), and reduction of costs, etc. Partitioning of the design into different types of modules or components can occur at this stage.

During logic design and functional verification 1116, modules or components in the circuit are specified in one or more description languages and the specification is checked for functional accuracy. For example, the components of the circuit may be verified to generate outputs that match the requirements of the specification of the circuit or system being designed. Functional verification may use simulators and other programs such as testbench generators, static HDL checkers, and formal verifiers. In some embodiments, special systems of components referred to as 'emulators' or 'prototyping systems' are used to speed up the functional verification.

During synthesis and design for test 1118, HDL code is transformed to a netlist. In some embodiments, a netlist may be a graph structure where edges of the graph structure represent components of a circuit and where the nodes of the graph structure represent how the components are interconnected. Both the HDL code and the netlist are hierarchical articles of manufacture that can be used by an EDA product to verify that the integrated circuit, when manufactured, performs according to the specified design. The netlist can be optimized for a target semiconductor manufacturing technology. Additionally, the finished integrated circuit may be tested to verify that the integrated circuit satisfies the requirements of the specification.

During netlist verification 1120, the netlist is checked for compliance with timing constraints and for correspondence with the HDL code. During design planning 1122, an overall floor plan for the integrated circuit is constructed and analyzed for timing and top-level routing.

During layout or physical implementation 1124, physical placement (positioning of circuit components such as transistors or capacitors) and routing (connection of the circuit components by multiple conductors) occurs, and the selection of cells from a library to enable specific logic functions can be performed. As used herein, the term 'cell' may specify a set of transistors, other components, and interconnections that provides a Boolean logic function (e.g., AND, OR, NOT, XOR) or a storage function (such as a flipflop or latch). As used herein, a circuit 'block' may refer to two or more cells. Both a cell and a circuit block can be referred to as a module or component and are enabled as both physical structures and in simulations. Parameters are specified for selected cells (based on 'standard cells') such as size and made accessible in a database for use by EDA products.

During analysis and extraction 1126, the circuit function is verified at the layout level, which permits refinement of the layout design. During physical verification 1128, the layout design is checked to ensure that manufacturing constraints are correct, such as DRC constraints, electrical constraints, lithographic constraints, and that circuitry function matches the HDL design specification. During resolution enhancement 1130, the geometry of the layout is transformed to improve how the circuit design is manufactured.

During tape-out, data is created to be used (after lithographic enhancements are applied if appropriate) for production of lithography masks. During mask data preparation 1132, the 'tape-out' data is used to produce lithography masks that are used to produce finished integrated circuits.

A storage subsystem of a computer system (such as computer system 1200 of FIG. 12) may be used to store the programs and data structures that are used by some or all of the EDA products described herein, and products used for development of cells for the library and for physical and logical design that use the library.

FIG. 12 illustrates an example machine of a computer system 1200 within which a set of instructions, for causing the machine to perform any one or more of the methodologies discussed herein, may be executed. In alternative implementations, the machine may be connected (e.g., networked) to other machines in a LAN, an intranet, an extranet, and/or the Internet. The machine may operate in the capacity of a server or a client machine in client-server network environment, as a peer machine in a peer-to-peer (or distributed) network environment, or as a server or a client machine in a cloud computing infrastructure or environment.

The machine may be a personal computer (PC), a tablet PC, a set-top box (STB), a Personal Digital Assistant (PDA), a cellular telephone, a web appliance, a server, a network router, a switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The example computer system 1200 includes a processing device 1202, a main memory 1204 (e.g., read-only memory (ROM), flash memory, dynamic random access memory (DRAM) such as synchronous DRAM (SDRAM), a static memory 1206 (e.g., flash memory, static random access memory (SRAM), etc.), and a data storage device 1218, which communicate with each other via a bus 1230.

Processing device 1202 represents one or more processors such as a microprocessor, a central processing unit, or the like. More particularly, the processing device may be complex instruction set computing (CISC) microprocessor, reduced instruction set computing (RISC) microprocessor, very long instruction word (VLIW) microprocessor, or a processor implementing other instruction sets, or processors implementing a combination of instruction sets. Processing device 1202 may also be one or more special-purpose processing devices such as an application specific integrated circuit (ASIC), a field programmable gate array (FPGA), a digital signal processor (DSP), network processor, or the like. The processing device 1202 may be configured to execute instructions 1226 for performing the operations and steps described herein.

The computer system 1200 may further include a network interface device 1208 to communicate over the network 1220. The computer system 1200 also may include a video display unit 1210 (e.g., a liquid crystal display (LCD) or a cathode ray tube (CRT)), an alphanumeric input device 1212 (e.g., a keyboard), a cursor control device 1214 (e.g., a mouse), a graphics processing unit 1222, a signal generation device 1216 (e.g., a speaker), graphics processing unit 1222, video processing unit 1228, and audio processing unit 1232.

The data storage device 1218 may include a machine-readable storage medium 1224 (also known as a non-transitory computer-readable medium) on which is stored one or more sets of instructions 1226 or software embodying any one or more of the methodologies or functions described herein. The instructions 1226 may also reside, completely or at least partially, within the main memory 1204 and/or within the processing device 1202 during execution thereof by the computer system 1200, the main memory 1204 and the processing device 1202 also constituting machine-readable storage media.

In some implementations, the instructions 1226 include instructions to implement functionality corresponding to the present disclosure. While the machine-readable storage medium 1224 is shown in an example implementation to be a single medium, the term "machine-readable storage medium" should be taken to include a single medium or multiple media (e.g., a centralized or distributed database, and/or associated caches and servers) that store the one or more sets of instructions. The term "machine-readable storage medium" shall also be taken to include any medium that is capable of storing or encoding a set of instructions for execution by the machine and that cause the machine and the processing device 1202 to perform any one or more of the methodologies of the present disclosure. The term "machine-readable storage medium" shall accordingly be taken to include, but not be limited to, solid-state memories, optical media, and magnetic media.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm may be a sequence of operations leading to a desired result. The operations are those requiring physical manipulations of physical quantities. Such quantities may take the form of electrical or magnetic signals capable of being stored, combined, compared, and otherwise manipulated. Such signals may be referred to as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the present disclosure, it is appreciated that throughout the description, certain terms refer to the action and processes of a computer system, or similar electronic computing device, that manipulates and transforms data represented as physical (electronic) quantities within the computer system's registers and memories into other data similarly represented as physical quantities within the computer system memories or registers or other such information storage devices.

The present disclosure also relates to an apparatus for performing the operations herein. This apparatus may be specially constructed for the intended purposes, or it may include a computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various other systems may be used with programs in accordance with the teachings herein, or it may prove convenient to construct a more specialized apparatus to perform the method. In addition, the present disclosure is not described with reference to any particular programming language. It will be appreciated that a variety of programming languages may be used to implement the teachings of the disclosure as described herein.

The present disclosure may be provided as a computer program product, or software, that may include a machine-readable medium having stored thereon instructions, which may be used to program a computer system (or other electronic devices) to perform a process according to the present disclosure. A machine-readable medium includes any mechanism for storing information in a form readable by a machine (e.g., a computer). For example, a machine-readable (e.g., computer-readable) medium includes a machine (e.g., a computer) readable storage medium such as a read only memory ("ROM"), random access memory ("RAM"), magnetic disk storage media, optical storage media, flash memory devices, etc.

In the foregoing disclosure, implementations of the disclosure have been described with reference to specific example implementations thereof. It will be evident that various modifications may be made thereto without departing from the broader spirit and scope of implementations of the disclosure as set forth in the following claims. Where the disclosure refers to some elements in the singular tense, more than one element can be depicted in the figures and like elements are labeled with like numerals. The disclosure and drawings are, accordingly, to be regarded in an illustrative sense rather than a restrictive sense.

What is claimed is:

1. A method comprising:
   obtaining a memory instance comprising a plurality of leaf cells, wherein each of the plurality of leaf cells comprises components;
   determining, by a processor, first channel connected components from the components within each of the plurality of leaf cells by tracing a propagation path between the components of each of the plurality of leaf cells;
   generating, by the processor, a first super leaf cell by combining a first two or more leaf cells of the plurality of leaf cells based on the first channel connected components;
   generating, by the processor, an updated memory instance based on the first super leaf cell; and
   determining, by the processor, a timing model for the updated memory instance.

2. The method of claim 1, further comprising characterizing the first super leaf cell to determine a first timing delay of the first super leaf cell.

3. The method of claim 2, wherein characterizing the first super leaf cell comprises performing at least one of a static analysis on the first super leaf cell and a transient analysis on the first super leaf cell.

4. The method of claim 2 further comprising generating a compiled netlist based on the timing model generated from the first timing delay of the first super leaf cell.

5. The method of claim 2 further comprising generating:
   a second super leaf cell by combining a second two or more leaf cells of the plurality of leaf cells based on second channel connected components; and
   characterizing the second super leaf cell to determine a second timing delay of the second super leaf cell, wherein determining the timing model for the updated memory instance comprises combining the first timing delay with the second timing delay.

6. The method of claim 1, further comprising updating the first super leaf cell based on a change to the memory instance.

7. The method of claim 1, further comprising generating a second memory instance based on the first super leaf cell.

8. The method of claim 1 further comprising generating:
   a second super leaf cell by combining a second two or more leaf cells of the plurality of leaf cells based on second channel connected components;
   determining the first super leaf cell and the second super leaf cell are equivalent; and
   replacing the second super leaf cell with the first super leaf cell within the updated memory instance.

9. A system comprising:
   a memory storing instructions; and
   a processor, coupled with the memory and configured to execute the instructions, the instructions when executed cause the processor to:
      obtain a memory instance comprising a plurality of leaf cells, wherein each of the plurality of leaf cells comprises components;
      determine first channel connected components from the components within each of the plurality of leaf cells by tracing a propagation path between the components of each of the plurality of leaf cells;
      generate a first super leaf cell by combining a first two or more leaf cells of the plurality of leaf cells based on the first channel connected components;
      generate an updated memory instance based on the first super leaf cell; and
      determine a timing model for the updated memory instance.

10. The system of claim 9, further comprising characterizing the first super leaf cell to determine a first timing delay of the first super leaf cell.

11. The system of claim 10, wherein characterizing the first super leaf cell comprises performing at least one of a static analysis on the first super leaf cell and a transient analysis on the first super leaf cell.

12. The system of claim 10 further comprising generating a compiled netlist based on the timing model generated from the first timing delay of the first super leaf cell.

13. The system of claim 10 further comprising generating:

a second super leaf cell by combining a second two or more leaf cells of the plurality of leaf cells based on second channel connected components; and characterizing the second super leaf cell to determine a second timing delay of the second super leaf cell, wherein determining the timing model for the updated memory instance comprises combining the first timing delay with the second timing delay.

14. The system of claim 9, further comprising updating the first super leaf cell based on a change to the memory instance.

15. The system of claim 9, further comprising generating a second memory instance based on the first super leaf cell.

16. A non-transitory computer readable medium comprising stored instructions, which when executed by a processor, cause the processor to:

determine first channel connected components and second channel connected components from components within a plurality of leaf cells of a memory instance;

generate a first super leaf cell by combining a first two or more of the plurality of leaf cells based on the first channel connected components;

generate a second super leaf cell by combining a second two or more of the plurality of leaf cells based on the second channel connected components;

determine a first timing delay of the first super leaf cell and a second timing delay of the second super leaf cell;

generate an updated memory instance based on the first super leaf cell and the second super leaf cell; and determine characteristics for the updated memory instance based on the first timing delay and the second timing delay.

17. The non-transitory computer readable medium of claim 16, wherein determining the first channel connected components and the second channel connected components comprises tracing propagation paths between the components of each of the plurality of leaf cells.

18. The non-transitory computer readable medium of claim 16, wherein determining the first timing delay and the second timing delay comprises performing at least one of a static analysis on the first super leaf cell and the second super leaf cell and a transient analysis on the first super leaf cell and the second super leaf cell.

\* \* \* \* \*